Jan. 30, 1968   E. SARBACH   3,366,832

SPARK GAP ARRANGEMENT FOR LIGHTNING ARRESTER

Filed Aug. 18, 1965

INVENTOR.
Ewald Sarbach
BY
Pierce, Scheffler & Parker
Attorneys

United States Patent Office 3,366,832
Patented Jan. 30, 1968

3,366,832
SPARK GAP ARRANGEMENT FOR
LIGHTNING ARRESTER
Ewald Sarbach, Baden, Switzerland, assignor to Aktiengesellschaft Brown, Boveri & Cie., Baden, Switzerland, a joint-stock company
Filed Aug. 18, 1965, Ser. No. 480,611
Claims priority, application Switzerland, Oct. 2, 1964, 12,823/64
7 Claims. (Cl. 315—36)

ABSTRACT OF THE DISCLOSURE

An over-voltage arrester structure comprises a stack of identical circular plates made of insulating material, and each plate is provided with a raised edge for receiving and centering the plate adjacent to it in the stack. Electrically inter-connected eccentrically located electrodes are positioned on opposite faces of each plate to establish spark gaps between the edges of electrodes of adjacent plates in the stack, and the plates are rotatable relative to each other thereby to enable these spark gaps to be accurately set. A gauge tool for setting the gaps is inserted into a radial aperture at the circumference of the plate so as to come between the edges of electrodes on adjacent plates. After all gaps have been set with the gauge, all plates in the stack are secured against further rotation by spraying the stack with a synthetic resin.

Figure 4:
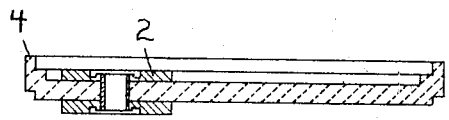

In the construction and manufacture of equipment for high-voltage networks, chiefly of transformers, there is more and more tendency to lower the insulation level and thus to reduce the manufacturing costs. This, however, makes it necessary to select a correspondingly low protection level which is able to insure sufficient protection. With the use of overvoltage, i.e. lightning arresters of the latest construction, it has today become possible to realize a protection level which lies below the upper limit of the internal overvoltages.

This requirement demanded of the arrester, to limit also switch overvoltages to $1.8 \ldots 2.3 \cdot U_L$ ($U_L$=quench voltage), requires in turn an increasing reduction of the interval between 0% and 100% response voltage at switch-overvoltages of the arrester. On the other hand, it is readily understandable also that such a low protection level can be realized meaningfully only when the control of the response values of the arresters can be kept within very narrow limits. This can be achieved by a good voltage control, and in particular by as low as possible a tolerance of the striking distance of the electrodes.

In the known arrester constructions which feature a lengthening of the arc by magnetic blowing, the lamellar formed electrodes are fitted firmly into the insulating plates which form the quench chambers, and the electrodes of two adjacent insulating plates form a spark gap. Moreover, the insulating plates are mutually fixed against rotation by cams. Observance of a certain electrode distance can be attained only by as accurate as possible a manufacture of the insulating plates (cams for fixing the electrodes and the plates relatively to each other) and especially also of the electrodes. Subsequent correction is possible only by pinching (reduction of the striking distance) or by grinding the electrodes down (increase of the striking distance). Besides, with the present construction of the spark gap stacks, measurement of the striking distance on the assembled stack is impossible, so that any deviations from the assigned values show up only during the electrical measurement of the consolidated stacks.

The present invention relates to a spark gap arrangement for overvoltage arresters having voltage-dependent resistors, where the quenching spark gap is comprised of a plurality of axially stacked circular plates of insulating material presenting an electrode on each side, the electrode of one plate forming a spark gap together with the electrode of the adjacent plate.

The purpose of the invention is to enable, in such overvoltage arresters, an accurate adjustment of the striking distance of the spark gaps without having to rely on a very precise manufacture of the insulating plates and electrodes. Their tolerance ranges can then be widened to such an extent that practically all waste in manufacture is avoided, so that the production costs of the arrester are lowered. Due to the adjustability of the striking distances, moreover, not only is the scatter of the response values much reduced, but it also readily becomes possible to fulfill special wishes with respect to the response voltage without having to machine each electrode specially.

According to the invention, these conditions are fulfilled in that each plate has a raised edge which serves as guide for the plate above and permits a rotation of the plates, and is further provided with a radial aperture in the vicinity of the axially stacked electrodes, the striking distance of the respective spark gap being adjusted by temporary introduction of a gauge into this aperture and relative rotation of the adjacent plates.

Figure 1:
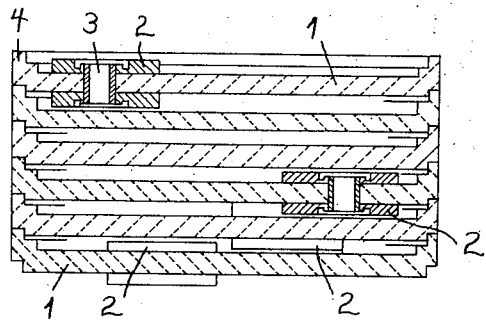
Figure 5:
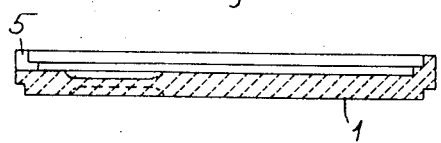
Figure 3:
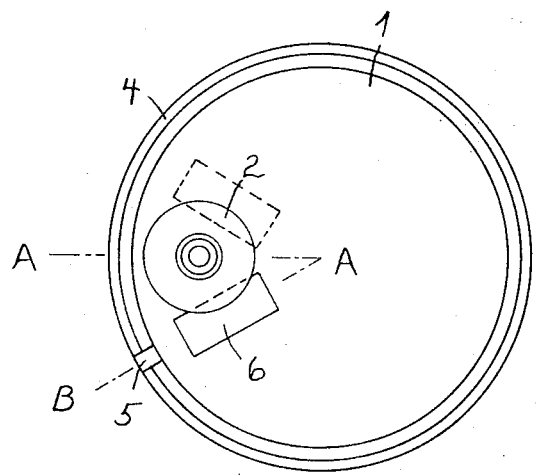
Figure 2:
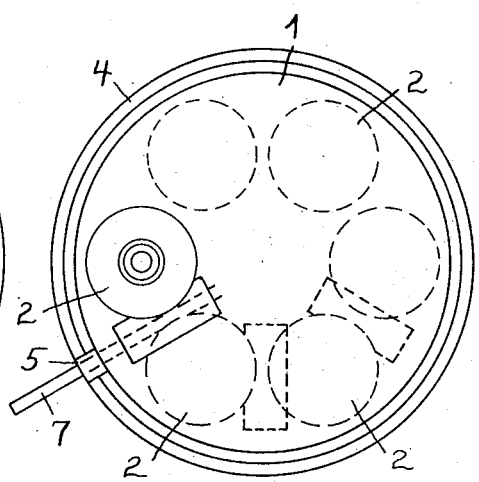

One suitable embodiment of the invention will now be explained in greater detail with reference to the accompanying drawings wherein:

FIG. 1 shows a stacked spark gap structure of an overvoltage arrester in central section;
FIG. 2 illustrates a top view of the stack;
FIG. 3 shows a single plate; and
FIGS. 4 and 5 represent respectively sections along lines A—A and A—B, of FIG. 3.

With reference now to the drawings, the spark gap arrangement is seen to be comprised of a plurality of stacked plates 1 of insulating material, on each of whose upper and lower sides a circular electrode 2 is fastened, the electrodes 2 being located eccentrically of the axis of the stack of plates. The attachment of these axially opposite electrodes is effected by means of a common hollow rivet 3. Electrode 2 on the upper side of a plate 1 forms a spark gap with the electrode on the lower side of an adjacent plate. Each plate 1 includes a raised stepped edge 4 which serves as guide for the plate above and permits mutual rotation of the plates. Furthermore, the plate edge 4 is provided in the vicinity of the oppositely disposed electrodes 2 with a radial aperture 5, which serves for the temporary introduction of a wire gauge. To increase the leakage path at the response point, each plate 1 presents a depression 6, which in the assembled plates comes to lie between the electrodes 2 of the spark gaps.

The production of the spark gap arrangement occurs by the following process, which constitutes a part of the present invention:

First, the plates 1 of insulating material carrying the eccentrically located electrodes 2 are placed one on the other, forming a stack, as shown in FIG. 1. By means of a suitable device the stack is then held together, and a gauge 7 (FIG. 7), to whose thickness the desired striking distance of the spark gap corresponds, is introduced into the radial aperture 5 of the bottom plate 1, whereupon the next plate is rotated in relation to the next higher one, until the edges of two electrodes 2, which form the respective spark gap, are spaced only by the inserted gauge between them. As soon as the striking distance of the spark gap is thus adjusted to gauge distance, the gauge 7 is pulled out and introduced into the aperture 5 of the next plate 1, whereupon by a rotation of the next higher plate the second spark gap is adjusted. This process is repeated until all spark gaps of the stack are adjusted. Then the stack is temporarily clamped in a clamping device and consolidated as a block by application of an external coating, for example, by spray application of a synthetic resin. The described production process can, of course, be carried out also in that first the topmost spark gap of the stack and then successively the next lower ones are adjusted.

In the top view according to FIG. 2, the position of the electrodes 2 forming the spark gaps after the adjustment of the striking distance of the spark gaps is indicated by the circles in broken lines. With the possibility of adjustment of the spark gaps after their assembly, an extremely simple disk form can be used for the electrodes, resulting in further cost reduction of the arrester.

The stack of plates 1 and their electrodes establish a plurality of spark gaps connected in series which are arranged to be connected in series with a plurality of series-arranged, voltage-dependent resistance units, not illustrated, thereby to form the complete arrester structure.

I claim:

1. In an over-voltage arrester structure, an arc-quenching gap structure comprising a stack of plates of electrical insulating material, each said plate having a circular configuration and a raised edge which functions to receive and center the plate next above in the stack and permit relative rotation of said plates, each said plate having electrically inter-connected electrodes on the opposite faces thereof located eccentrically of the axis of said stack of plates thereby to establish spark gaps respectively between the edges of electrodes of adjacent plates in the stack, the length of each said spark gap being variable and determined by the relative rotational positions of adjacent plates, and each said plate being provided with a radially extending aperture adjacent an edge of one of the electrodes thereon for insertion of a gauge to set the spark gap between that electrode and the electrode coordinated thereto on the adjacent plate.

2. An over-voltage arrester structure as defined in claim 1 wherein said electrodes on opposite faces of each said plate are mechanically and electrically interconnected by means of a rivet.

3. An over-voltage arrester structure as defined in claim 1 wherein said electrodes on opposite faces of each said plate have a circular configuration.

4. An over-voltage arrester structure as defined in claim 1 wherein said electrodes on opposite faces of each said plate have a circular configuration and are secured in place by means of an electrically conductive rivet which passes through the plate.

5. The method of producing a stack of spark gaps to constitute an over-voltage arrester structure which comprises the steps of assembling a stack of plates of insulating material each of which has a circular configuration and a raised edge which functions to center the plates of the stack on a common axis and permit relative rotation of the plates about that axis, each of said plates also having electrically interconnected electrodes on the opposite faces thereof located eccentrically of the axis of said stack of plates thereby to establish spark gaps respectively between the edges of electrodes of adjacent plates in the stack and a radially extending aperture adjacent one of the electrodes thereon for temporary insertion of a gauge for setting the spark gap between that electrode and the electrode coordinated thereto on an adjacent plate by effecting relative rotation between adjacent plates, setting the spark gaps in said stack in progression starting with adjacent plates at one end of the stack, and thereafter finally securing the plates of said stack against any further relative rotation.

6. The method of producing a stack of spark gaps as defined in claim 5 wherein said stack of plates are finally secured against relative rotation following setting of all spark gaps by applying an external coating thereto.

7. The method of producing a stack of spark gaps as defined in claim 5 wherein said stack of plates are finally secured against relative rotation following setting of all spark gaps by spraying said stack of plates with a synthetic resin.

References Cited

UNITED STATES PATENTS

| | | | |
|---|---|---|---|
| 2,615,145 | 10/1952 | Rydbeck | 315—52 |
| 2,917,662 | 12/1959 | Cunningham | 315—36 |

JAMES W. LAWRENCE, *Primary Examiner.*

P. C. DEMEO, *Assistant Examiner.*